United States Patent
Nakano et al.

(10) Patent No.: US 12,477,373 B2
(45) Date of Patent: Nov. 18, 2025

(54) MANAGEMENT DEVICE, MANAGEMENT METHOD, AND RECORDING MEDIUM

(71) Applicant: Panasonic Intellectual Property Management Co., Ltd., Osaka (JP)

(72) Inventors: Toshihisa Nakano, Osaka (JP); Yuishi Torisaki, Osaka (JP); Jun Anzai, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 351 days.

(21) Appl. No.: 18/135,531

(22) Filed: Apr. 17, 2023

(65) Prior Publication Data

US 2023/0262505 A1    Aug. 17, 2023

Related U.S. Application Data

(63) Continuation of application No. PCT/JP2021/037827, filed on Oct. 13, 2021.

(30) Foreign Application Priority Data

Oct. 27, 2020    (JP) ................................ 2020-179464

(51) Int. Cl.
*H04W 24/10* (2009.01)
*H04W 12/12* (2021.01)

(52) U.S. Cl.
CPC ........... *H04W 24/10* (2013.01); *H04W 12/12* (2013.01)

(58) Field of Classification Search
CPC ...... H04W 24/10; H04W 12/12; H04L 12/66; H04L 41/069; H04L 43/04
See application file for complete search history.

(56) References Cited

U.S. PATENT DOCUMENTS

| 2015/0191135 | A1 | 7/2015 | Ben Noon et al. |
| 2017/0013005 | A1* | 1/2017 | Galula ................ H04L 63/1425 |
| 2018/0316667 | A1* | 11/2018 | Wada .................. H04W 12/108 |

(Continued)

FOREIGN PATENT DOCUMENTS

| JP | 2015-136107 | 7/2015 |
| JP | 2018-125680 | 8/2018 |

(Continued)

OTHER PUBLICATIONS

Al-Jarrah OY, Maple C, Dianati M, Oxtoby D, Mouzakitis A. Intrusion detection systems for intra-vehicle networks: A review. Ieee Access. Feb. 14, 2019;7:21266-89. (Year: 2019).*

(Continued)

*Primary Examiner* — Fayyaz Alam
(74) *Attorney, Agent, or Firm* — Greenblum & Bernstein, P.L.C.

(57) ABSTRACT

A management device includes: an obtainer that obtains, from a processing device, a log of operation performed by the processing device and verification data for certifying that the log is valid information; a verifier that performs verification of whether the log is valid information, based on the verification data obtained by the obtainer; and a controller that performs storage control for storing the log as an analysis log for analyzing an anomaly into a storage device, in accordance with a result of the verification performed by the verifier.

12 Claims, 9 Drawing Sheets

(56) References Cited

U.S. PATENT DOCUMENTS

2020/0336504 A1* 10/2020 Maeda .................... H04W 4/48
2020/0389469 A1* 12/2020 Litichever ............. H04W 12/12

FOREIGN PATENT DOCUMENTS

WO          2019/193786        10/2019
WO      WO-2019193786 A1 * 10/2019   ........... B60R 16/023

OTHER PUBLICATIONS

Tomlinson A, Bryans J, Shaikh SA, Kalutarage HK. Detection of automotive CAN cyber-attacks by identifying packet timing anomalies in time windows. In2018 48th Annual IEEE/IFIP international conference on dependable systems and networks workshops (DSN-W) Jun. 25, 2018 (pp. 231-238). IEEE. (Year: 2018).*

International Search Report (ISR) from International Searching Authority (Japan Patent Office) in International Pat. Appl. No. PCT/JP2021/037827, dated Jan. 11, 2022, together with an English language translation.

* cited by examiner

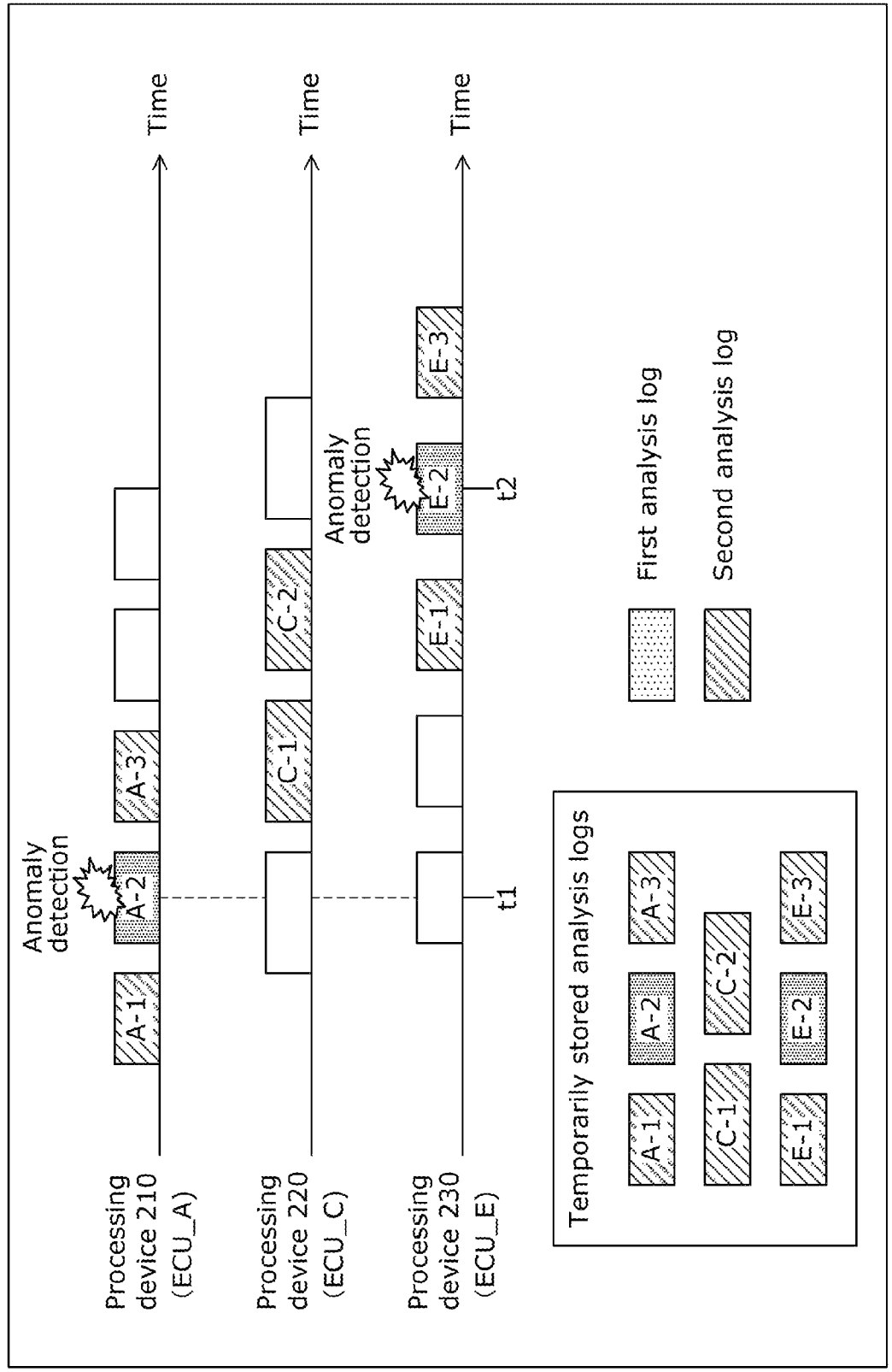

FIG. 7

| Pattern 1 | Voluntary transmission of first analysis log | Transmission of second analysis log by request |
|---|---|---|
| Validity verified | Transmit | Transmit |
| Validity not verified | Not transmit | Transmit |

FIG. 8

| Pattern 2 | Voluntary transmission of first analysis log | Voluntary transmission of second analysis log |
|---|---|---|
| Validity verified | Transmit | Transmit |
| Validity not verified | Not transmit | Not transmit |

FIG. 9

| Pattern 3 | Transmission of first analysis log by request | Transmission of second analysis log by request |
|---|---|---|
| Validity verified | Transmit | Transmit |
| Validity not verified | Transmit | Transmit |

MANAGEMENT DEVICE, MANAGEMENT METHOD, AND RECORDING MEDIUM

CROSS REFERENCE TO RELATED APPLICATIONS

This is a continuation application of PCT International Application No. PCT/JP2021/037827 filed on Oct. 13, 2021, designating the United States of America, which is based on and claims priority of Japanese Patent Application No. 2020-179464 filed on Oct. 27, 2020. The entire disclosures of the above-identified applications, including the specifications, drawings and claims are incorporated herein by reference in their entirety.

FIELD

The present disclosure relates to a management device, a management method, and a recording medium.

BACKGROUND

Patent Literature (PTL) 1 discloses a technique for receiving communication traffic data from vehicles via a communication network to aggregate the communication traffic data of the vehicles, and obtaining high-order information against cyberattacks on the vehicles.

CITATION LIST

Patent Literature

PTL 1: Japanese Unexamined Patent Application Publication No. 2015-136107

SUMMARY

Technical Problem

The present disclosure provides, for example, a management device capable of making further improvements.

Solution to Problem

A management device according to the present disclosure includes: an obtainer that obtains, from a processing device, a log of operation or communication performed by the processing device and verification data for certifying that the log is valid information; a verifier that performs verification of whether the log is valid information, based on the verification data obtained by the obtainer; and a controller that performs storage control for storing the log as an analysis log for analyzing an anomaly into a storage device, in accordance with a result of the verification performed by the verifier.

It should be noted that these general and specific aspects may be implemented as a system, a method, an integrated circuit, a computer program, or a computer-readable recording medium such as a CD-ROM, or may be implemented as any combination of a system, a method, an integrated circuit, a computer program, and a computer-readable recording medium.

Advantageous Effects

A management device etc. according to the present disclosure is capable of making further improvements.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6 is a diagram for illustrating how to determine a log generated when a processing device detects an anomaly.

FIG. 7 is a diagram for illustrating pattern 1 of transmission control.

FIG. 8 is a diagram for illustrating pattern 2 of the transmission control.

FIG. 9 is a diagram for illustrating pattern 3 of the transmission control.

Figure 1:
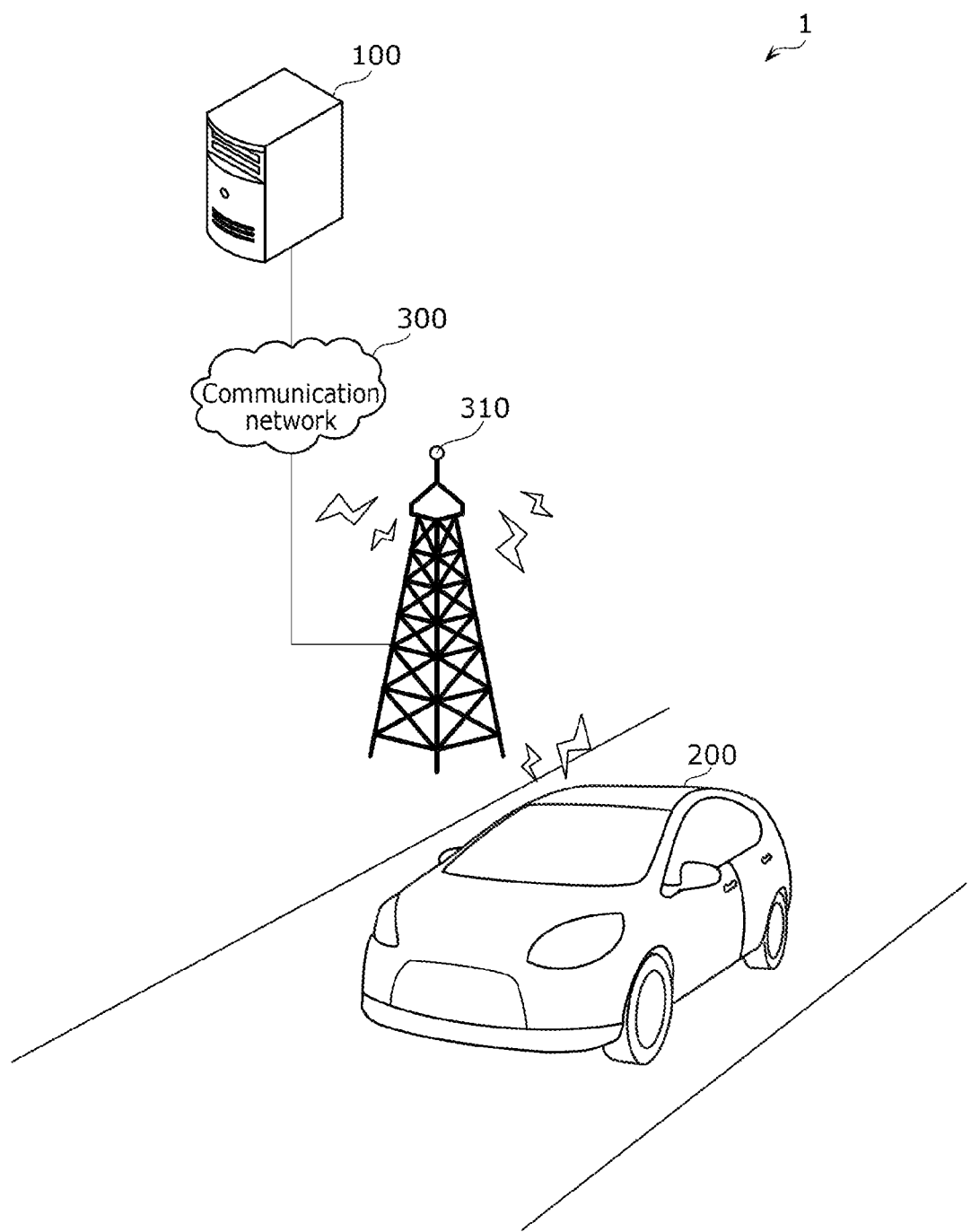
FIG. 1 is a schematic view of a management system according to an embodiment that aggregates analysis logs of a vehicle to a server.

DESCRIPTION OF EMBODIMENT (Underlying Knowledge Forming Basis of Present Disclosure)

The inventors discovered the following problems related to the conventional art described in "Background".

In the technique disclosed in PTL 1, since verification of whether communication traffic data is valid is not performed, even invalid communication traffic data may be temporarily stored or transmitted to an external server. As stated above, since the conventional technique does not make it possible to properly manage an analysis log based on information (a log) generated when a processing device operates, such as communication traffic data, storage capacity for storing analysis logs is increased, and inappropriate analysis logs are aggregated.

In order to solve such problems, the inventors have found a management device and a management method that are capable of properly managing an analysis log.

A management device according to the present disclosure includes: an obtainer that obtains, from a processing device, a log of operation or communication performed by the processing device and verification data for certifying that the log is valid information; a verifier that performs verification of whether the log is valid information, based on the verification data obtained by the obtainer; and a controller that performs storage control for storing the log as an analysis log for analyzing an anomaly into a storage device, in accordance with a result of the verification performed by the verifier.

With this configuration, since the storage of the log into the storage device is controlled according to whether the log is valid based on the verification data, it is possible to manage the analysis log appropriately.

Moreover, when the result of the verification indicates that the log is valid information, the controller may store the log as the analysis log into the storage device.

For this reason, it is possible to reduce the storage capacity of the storage device.

Furthermore, when the result of the verification indicates that the log is not valid information, the controller may store the log as the analysis log into the storage device together with invalid identification information, the invalid identification information indicating that the log is not valid information.

Accordingly, when the log is invalid, it is possible to store the log as an analysis log that is invalid into the storage device.

Moreover, when the result of the verification indicates that the log is not valid information, the controller may transmit a re-transmission request for the log and the verification data to the processing device. The obtainer may obtain the log and the verification data that are re-transmitted from the processing device in response to the re-transmission request. The verifier may perform the verification based on the verification data re-transmitted. When the result of the verification indicates that the log is valid information, the controller may update the analysis log that is invalid stored in the storage device with the log re-transmitted.

For this reason, when the log is invalid, it is possible to replace the analysis log that is invalid stored in the storage device with the analysis log that is valid.

Furthermore, the controller may store, into the storage device, a log as a first analysis log in which the processing device has detected an anomaly, and store, into the storage device, a log as a second analysis log that is generated by the processing device at a timing prior to or subsequent to a timing at which the first analysis log is generated by the processing device.

Accordingly, it is possible to store, into the storage device, the analysis log generated when the anomaly is detected and the analysis log generated when the anomaly is not detected in distinction from each other.

Moreover, the controller may perform transmission control for transmitting the analysis log to a server, in accordance with the result of the verification.

With this configuration, since whether the analysis log is transmitted to the server is controlled in accordance with the result of the verification, it is possible to manage the analysis log appropriately.

Furthermore, in the transmission control, when the result of the verification indicates that the analysis log is not valid information, the controller may transmit the analysis log to the server together with the invalid identification information.

For this reason, the server is capable of storing the analysis log that is invalid and the analysis log that is valid in distinction from each other.

Moreover, in the transmission control: when the obtainer obtains a first analysis log in which the processing device has detected an anomaly, the controller may voluntarily transmit the first analysis log to the server; and when the obtainer receives, from the server, a transmission request for a second analysis log generated by the processing device at a timing prior to or subsequent to a timing at which the first analysis log is generated by the processing device, the controller may transmit the second analysis log to the server in response to the transmission request.

Accordingly, the management device is capable of immediately transmit, to the server, the first analysis log generated when the anomaly is detected.

The management device may further include a determiner that determines whether a cyberattack has been carried out on a mobile body including the processing device, in accordance with the result of the verification.

For this reason, since it is possible to respond to the cyberattack when the cyberattack is determined to have been carried out on the mobile body, it is possible to prevent the driving control of the mobile body from being subject to the influence of the cyberattack and improve the safety of a vehicle.

Furthermore, the processing device may be an electronic control unit (ECU) included in a vehicle.

A management method according to one aspect of the present disclosure includes: obtaining, from a processing device, a log of operation or communication performed by the processing device and verification data for certifying that the log is valid information; performing verification of whether the log is valid information, based on the verification data obtained; and performing storage control for storing the log as an analysis log for analyzing an anomaly into a storage device, in accordance with a result of the verification.

With this configuration, since the storage of the log into the storage device is controlled according to whether the log is valid based on the verification data, it is possible to manage the analysis log appropriately.

A recording medium according to one aspect of the present disclosure is a non-transitory computer-readable recording medium having recorded thereon a computer program for causing a computer to execute the management method.

With this configuration, since the storage of the log into the storage device is controlled according to whether the log is valid based on the verification data, it is possible to manage the analysis log appropriately.

It should be noted that these general and specific aspects may be implemented as a system, a method, an integrated circuit, a computer program, or a computer-readable recording medium such as a CD-ROM, or may be implemented as any combination of a system, a method, an integrated circuit, a computer program, and a computer-readable recording medium.

Hereinafter, an embodiment will be described in detail with reference to the Drawings as necessary. However, there are instances where overly detailed description is omitted. For example, there are instances where detailed description of well-known matter and overlapping description of substantially identical elements are omitted. This is to avoid unnecessary redundancy and provide easy-to-read descriptions for a person skilled in the art.

It should be noted that the accompanying Drawings and the subsequent description are provided by the inventor(s) in order for a person skilled in the art to sufficiently understand the present disclosure, and are thus not intended to limit the subject matter recited in the claims.

Embodiment

Hereinafter, an embodiment will be described with reference to FIG. 1 to FIG. 11.

[Configuration]

FIG. 1 is a schematic view of a management system according to an embodiment that aggregates analysis logs of a vehicle to a server.

Specifically, FIG. 1 shows server 100, vehicle 200, communication network 300, and base station 310 of a mobile communication network. Management system 1 includes server 100, vehicle 200, and communication network 300.

Server 100 obtains analysis logs from vehicle 200 via communication network 300 and stores the analysis logs obtained. Server 100 analyzes an anomaly that has occurred in vehicle 200, using an analysis log.

Vehicle 200 is a mobile body communicably connectable to the mobile communication network via base station 310. Vehicle 200 is, for example, a mobile body the operation of which can be controlled by, for example, autonomous driving or an advanced driver-assistance system.

Although FIG. 1 shows one vehicle 200, server 100 may obtain analysis logs from vehicles 200 via communication network 300. Server 100 may analyze, for each of vehicles 200, an anomaly that has occurred, or may analyze, for each of vehicle types such as vehicle models or vehicle manufacturers, an anomaly that has occurred.

Figure 2:
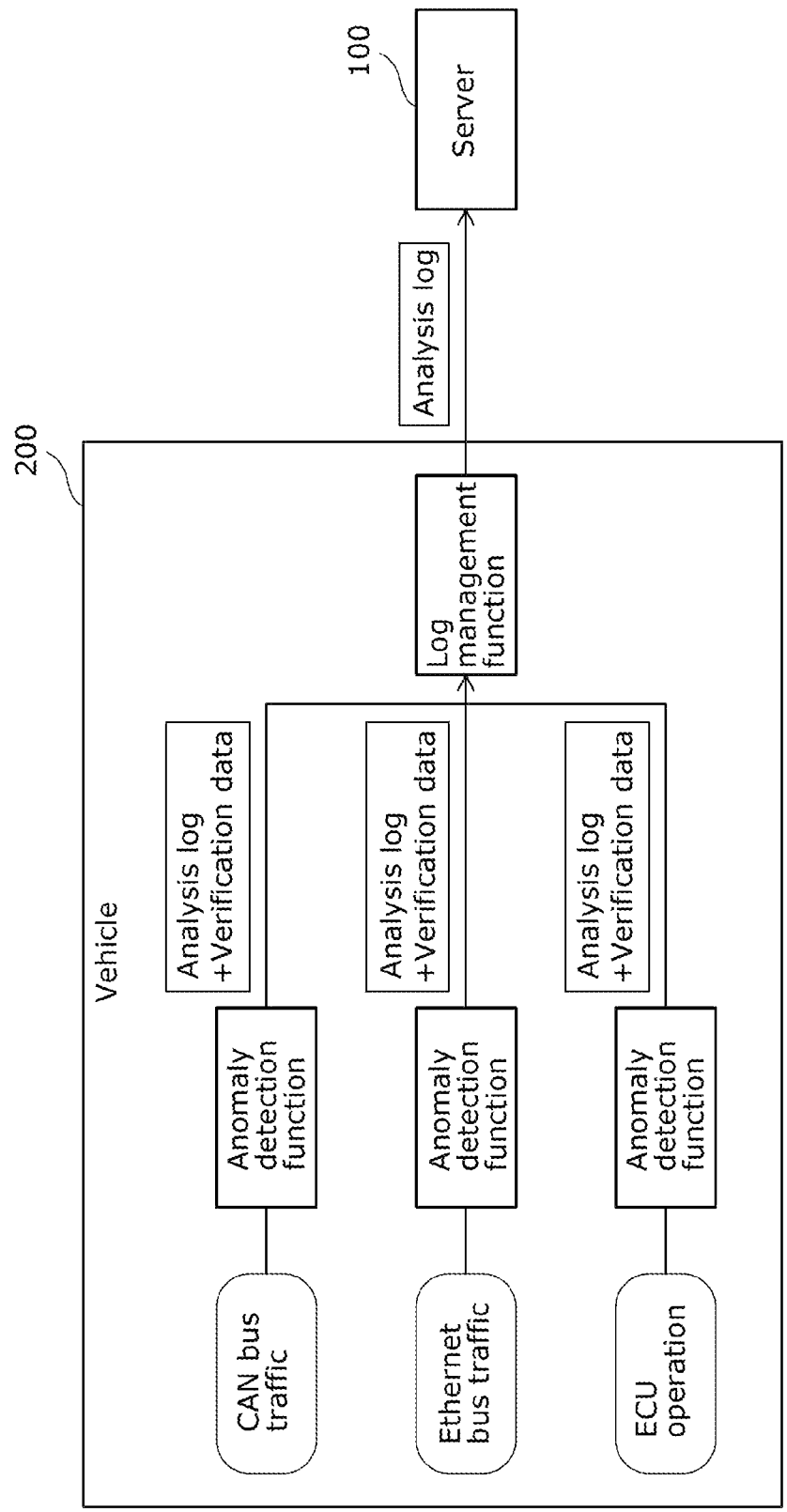
FIG. 2 is a schematic diagram for illustrating an outline of functions of the vehicle.

Next, an outline of functions of vehicle 200 will be described. FIG. 2 is a schematic diagram for illustrating an outline of functions of the vehicle.

As shown in FIG. 2, vehicle 200 has anomaly detection functions. Vehicle 200 may have, for example, an anomaly detection function of detecting an anomaly related to a communication traffic log in a controller area network (CAN) bus; an anomaly detection function of detecting an anomaly related to a communication traffic log in Ethernet (registered trademark) bus traffic; and an anomaly detection function of detecting an anomaly related to a log of operation performed by an electronic control unit (ECU). The anomaly detection functions are implemented by some of ECUs included in vehicle 200.

Moreover, vehicle 200 has a log management function of obtaining a log generated when an ECU operates and managing the log obtained. Specifically, the log management function is storage control for extracting an analysis log from obtained logs and storing the analysis log into a storage device or a function of managing an analysis log by controlling transmission of the analysis log to server 100. The log management function is implemented by some of the ECUs included in vehicle 200. It should be noted that ECUs implementing the anomaly detection functions and ECUs implementing the log management function may be the same ECUs or different ECUs.

An ECU sequentially generates a log of operation performed by the ECU. An ECU implementing the anomaly detection functions outputs, together with verification data, a log generated when an anomaly is detected to an ECU implementing the log management function. Verification data is information for certifying that a log is valid information. Verification data is, for example, an electronic signature for certifying that a log is transmitted by an ECU implementing the anomaly detection functions.

Next, the hardware configurations of server 100 and vehicle 200 are described in sequence.

Figure 3:
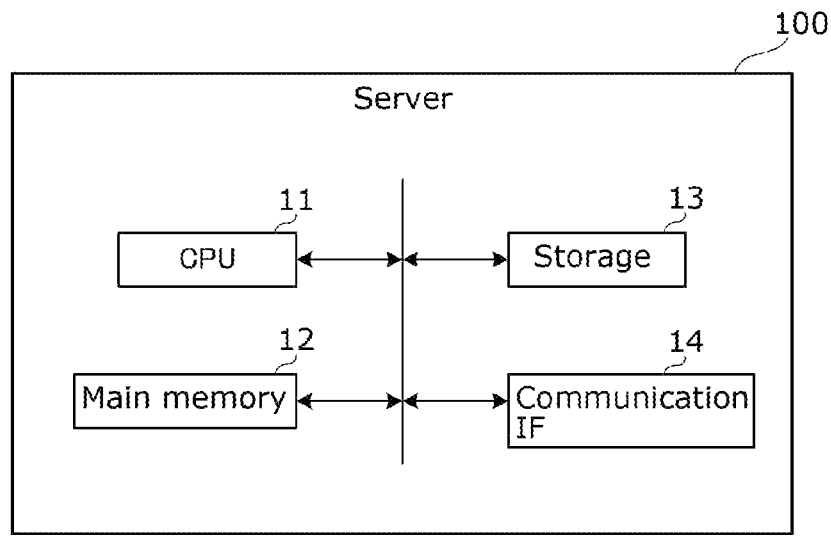
FIG. 3 is a block diagram illustrating an example of a hardware configuration of the server according to the embodiment.

FIG. 3 is a block diagram illustrating an example of a hardware configuration of the server according to the embodiment.

As shown in FIG. 3, server 100 includes, as a hardware configuration, central processing unit (CPU) 11, main memory 12, storage 13, and communication interface (IF) 14.

CPU 11 is a processor that executes a control program stored in, for example, storage 13.

Main memory 12 is a volatile storage area used as a work area when CPU 11 executes the control program.

Storage 13 is a nonvolatile storage area that holds the control program, analysis logs, etc.

Communication IF 14 is a communication interface that communicates with vehicles 200 via communication network 300. Communication IF 14 is, for example, a wired Local Area Network (LAN) interface. It should be noted that communication IF 14 may be a wireless LAN interface. Moreover, communication IF 14 is not limited to a LAN interface, and may be any communication interface that can establish a communication connection to a communication network.

Figure 4:
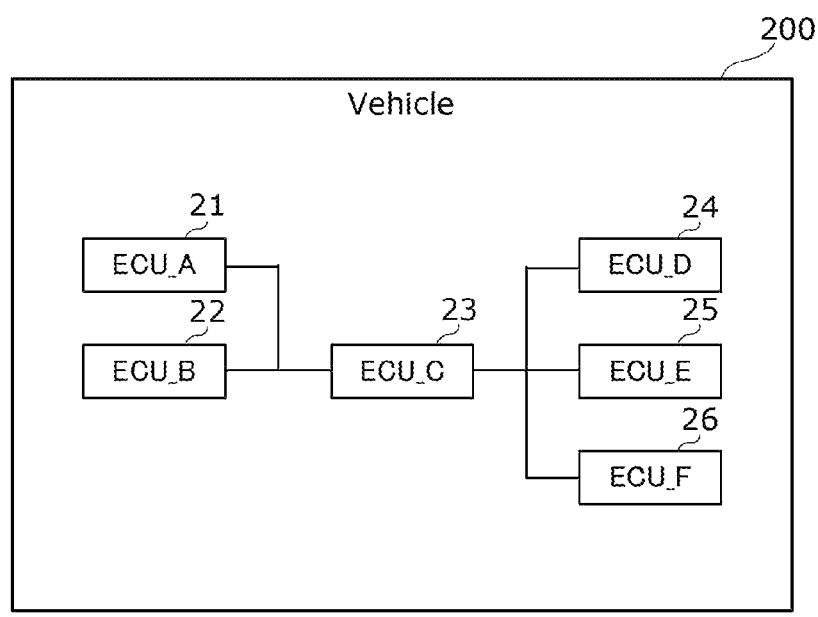
FIG. 4 is a block diagram illustrating an example of a hardware configuration of the vehicle according to the embodiment.

FIG. 4 is a block diagram illustrating an example of a hardware configuration of the vehicle according to the embodiment.

As shown in FIG. 4, vehicle 200 includes ECUs as a hardware configuration. The ECUs include ECU_A21, ECU_B22, ECU_C23, ECU_D24, ECU_E25, and ECU_F26. Although FIG. 4 shows six ECUs as the ECUs, the number of ECUs is not limited to six.

ECU_A21, ECU_B22, ECU_C23, and ECU_E25 each are, for example, a processing device having an anomaly detection function. Moreover, among these ECUs, ECU_A21 may be a communication unit for vehicle 200 to wirelessly communicate with communication network 300. ECU_A21 may be a communication unit including a cellular module compliant with mobile communication network standards. ECU_A21 may be a telematics control unit (TCU).

At least one of the ECUs included in vehicle 200 may generate a control command for autonomous driving of vehicle 200. Specifically, this ECU generates a control command for controlling, for example, the steering of vehicle 200, the power source such as the engine and motor for rotating the wheel, and the brake for braking the wheel. In other words, the control command causes vehicle 200 to perform at least one of advancing (i.e., traveling), turning, or stopping. The ECU transmits the generated control command to the other ECUs.

The other ECUs included in vehicle 200 are control circuits that control various equipment such as the engine, motor, meter, transmission, brake, steering, power window, and air conditioner included in vehicle 200. For example, each of the ECUs may be provided for a corresponding one of the various equipment. Though not shown, at least one of the ECUs may include a storage portion that stores a program. The storage portion is, for example, nonvolatile memory.

Next, a functional configuration of vehicle 200 in management system 1 will be described with reference to FIG. 5.

Figure 5:
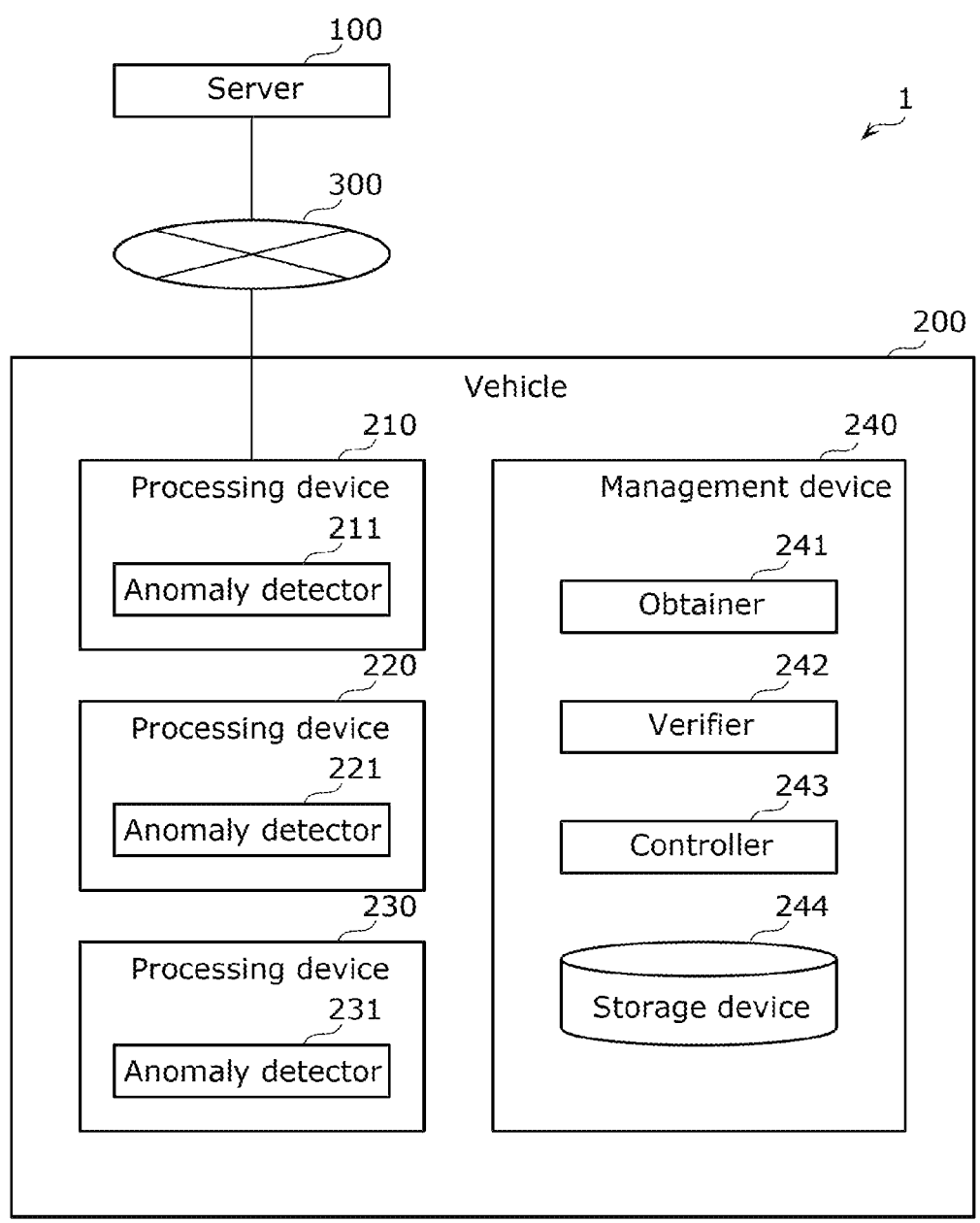
FIG. 5 is a block diagram illustrating an example of a functional configuration of the vehicle in the management system according to the embodiment.

FIG. 5 is a block diagram illustrating an example of a functional configuration of the vehicle in the management system according to the embodiment.

Vehicle 200 includes processing devices 210, 220, and 230 and management device 240.

Processing devices 210, 220, and 230 each are the processing device having the anomaly detection function described with reference to FIG. 2. Processing device 210 includes anomaly detector 211. Anomaly detector 211 detects, for example, an anomaly related to communication traffic in a CAN bus. Processing device 220 includes anomaly detector 221. Anomaly detector 221 detects, for example, an anomaly related to communication traffic in an Ethernet (registered trademark) bus. Processing device 230 includes anomaly detector 231. Anomaly detector 231 detects an anomaly related to the operation of an electronic control unit (ECU). When anomaly detectors 211, 221, and 231 each detect an anomaly, processing devices 210, 220, and 230 each output, as an analysis log, a log generated when the anomaly is detected. Moreover, processing devices 210, 220, and 230 each output verification data to management device 240 together with the analysis log. For example, processing devices 210, 220, and 230 may each generate, as verification data, an electronic signature generated by encrypting a hash value of a corresponding analysis log using a private key held therein.

When generating a log, processing devices 210, 220, and 230 may each add, to the log, time at which the log is generated and an identifier for identifying the processing device, or may each add, to the log, an identifier for uniquely identifying the log. In this manner, the log can be uniquely identified using the set of the time and the identifier for identifying the processing device or the identifier for uniquely identifying the log.

Each of processing devices 210, 220, and 230 is implemented by, for example, one of ECU_A21, ECU_B22, ECU_C23, and ECU_E25. Moreover, each of processing devices 210, 220, and 230 may be implemented by, for example, a combination of any two or more of ECU_A21, ECU_B22, ECU_C23, and ECU_E25.

Management device 240 is implemented by the ECU performing the log management function described with reference to FIG. 2. Management device 240 is implemented by, for example, ECU_D24.

Management device 240 includes obtainer 241, verifier 242, controller 243, and storage device 244.

Obtainer 241 obtains a log and verification data from each of processing devices 210, 220, and 230. It should be noted that one log and one verification data may form a pair, or logs and one verification data may form a pair. In other words, each of processing devices 210, 220, and 230 may output one verification data to management device 240 together with one log, or may output one verification data to management device 240 together with logs.

Verifier 242 performs verification of whether a log is valid information, based on verification data obtained by obtainer 241. For example, verifier 242 decodes verification data using a public key of a processing device having outputted a log, and compares a hash value generated using the log and a hash value obtained by the decoding. Then, verifier 242 determines that the log is valid information when the two hash values match each other, and determines that the log is invalid information when the two hash values do not match each other.

Controller 243 controls storage of the log into storage device 244, in accordance with a result of the verification performed by verifier 242. Specifically, when the result of the verification indicates that the log is valid information, controller 243 stores, as an analysis log, the log determined as the valid information into storage device 244. Moreover, when the result of the verification indicates that the log is not valid information, that is, when the log is invalid information, controller 243 stores the log as an analysis log into storage device 244 together with invalid identification information indicating that the log is not valid information.

It should be noted that when the result of the verification indicates that the log is valid information, controller 243 may store, as the analysis log, the log determined as valid into storage device 244 without adding identification information as stated above, or may store, into storage device 244, the log as the analysis log together with the valid identification information indicating that the log determined as valid information is valid information. As stated above, when the valid identification information is added to the log determined as valid information and the log is stored into storage device 244, and the invalid identification information is added to the log determined as invalid information and the log is stored into storage device 244, the valid identification information and the invalid identification information may each be indicated by identification information indicating whether the log is valid. In this case, for example, the identification information may be a flag indicated by 0 or 1. The flag indicated by 0 indicates that the log is valid, and the flag indicated by 1 indicates that the log is invalid.

Furthermore, controller 243 may store a log into storage device 244 in distinction from other logs, according to whether the log is generated when an anomaly is detected. This will be described with reference to FIG. 6.

FIG. 6 is a diagram for illustrating how to determine a log generated when a processing device detects an anomaly. FIG. 6 shows an example in which processing devices 210, 220, and 230 are implemented by ECU_A21, ECU_C23, and ECU_E25, respectively.

As shown in FIG. 6, controller 243 of management device 240 stores, as a first analysis log, log A-2 in which processing device 210 has detected an anomaly, into storage device 244. Controller 243 stores, as second analysis logs, log A-1 and log A-3 generated at a timing prior to and subsequent to time t1 at which the anomaly is detected, into storage device 244. A second analysis log is a log in which an anomaly has not detected. Second analysis logs may be not only log A-1 and log A-3 temporally adjacent to log A-2 in which the anomaly has been detected but also any log (i) which is generated in a predetermined period with reference to time t1 at which the anomaly of log A-2 is detected and (ii) in which an anomaly has not detected. To put it differently, second analysis logs may include a log generated at a timing prior to log A-1 and a log generated at a timing subsequent to log A-3, as long as these logs are generated in the predetermined period. The predetermined period may be a period having time t1 at the center.

It should be noted that each of processing devices 210, 220, and 230 may output, among logs sequentially generated, a log generated when an anomaly is detected as a first analysis log to management device 240, and may output a log generated at a timing prior to or subsequent to the first analysis log as a second analysis log to management device 240. It should also be noted that when outputting a log as a first analysis log, each of processing devices 210, 220, and 230 may add identification information indicating the first analysis log to the log, and when outputting a log as a second analysis log, each of processing devices 210, 220, and 230 may add identification information indicating the second analysis log to the log.

Moreover, each of processing devices 210, 220, and 230 may directly output logs sequentially generated to management device 240. In this case, each of processing devices 210, 220, and 230 outputs information indicating a log in which an anomaly is detected to management device 240. In this way, management device 240 may extract a first analysis log and a second analysis log from the logs received from each of processing devices 210, 220, and 230, and store the first analysis log and the second analysis log extracted into storage device 244. Identification information indicating the first analysis log may be added to a log, and the log may be stored as the first analysis log into storage device 244. Likewise, identification information indicating the second analysis log may be added to a log, and the log may be stored as the second analysis log into storage device 244. Furthermore, the first analysis log and the second analysis log may be distinguished by separating storage areas used by storage device 244. In other words, a log may be stored as the first analysis log into a first storage area of storage device 244. Additionally, a log may be stored as the second analysis log into a second storage area of storage device 244 different from the first storage area.

Moreover, each of processing devices 210, 220, and 230 may output only the log generated when an anomaly is detected as the first analysis log to management device 240. In this case, management device 240 may specify a processing device that has generated the second analysis log and a period, based on the first analysis log, and output, to the specified processing device, a transmission request for the generated log in the specified period. As a result, management device 240 is capable of receiving the second analysis log from each of processing devices 210, 220, and 230.

Furthermore, controller 243 of management device 240 stores, as a first analysis log, log E-2 in which processing device 230 has detected an anomaly, into storage device 244. Controller 243 stores, as second analysis logs, log E-1 and log E-3 generated at a timing prior to and subsequent to time t2 at which the anomaly is detected, into storage device 244. This process is the same as the process performed on the log in which processing device 210 has detected the anomaly.

Moreover, controller 243 of management device 240 stores, among logs generated by processing device 220, log C-1 and log C-2 generated in a period between time t1 at which processing device 210 detects an anomaly and time t2 at which processing device 230 detects an anomaly, as second analysis logs into storage device 244. This is because the ECUs of vehicle 200 are configured to cause information obtained by ECU_A21 to flow to ECU_E25 via ECU_C23. In other words, when processing device 210 (ECU_A21) detects the anomaly at time t1 and processing device 230 (ECU_E25) detects the anomaly at time t2, there is a high possibility that processing device 230 detects the anomaly due to the anomaly detected by processing device 210. For this reason, there is a high possibility that although an anomaly has not been detected in a log by processing device 220 on a path along which information flows from processing device 210 to processing device 230, the log is subject to the influence of the anomaly. Accordingly, by storing, as the second analysis logs, log C-1 and log C-2 generated by processing device 220 between time t1 and time t2 into storage device 244, it is possible to analyze an anomaly effectively.

As stated above, controller 243 extracts, as analysis logs to be analyzed by server 100, not only the first analysis log in which the anomaly is detected but also the second analysis log likely to be subject to the influence of the anomaly, from the logs generated by each of processing devices 210, 220, and 230. This enables server 100 to analyze an anomaly effectively.

Furthermore, when a result of verification performed by verifier 242 indicates that a log is not valid information, controller 243 may output a re-transmission request for the same log as the log and verification data to the processing device that has outputted the log. In this case, the processes performed by obtainer 241, verifier 242, and controller 243 are repeated for the log and the verification data re-transmitted by the processing device in response to the re-transmission request. Specifically, obtainer 241 obtains the log and the verification data re-transmitted by the processing device in response to the re-transmission request. Verifier 242 performs verification of whether the log is valid information, based on the verification data re-transmitted. When a result of the verification indicates that the log is valid information, controller 243 updates an analysis log stored in storage device 244 with an analysis log re-transmitted. In this case, controller 243 deletes invalid identification information of the analysis log stored in storage device 244.

Moreover, controller 243 performs transmission control for transmitting analysis logs stored in storage device 244 to server 100, in accordance with the result of the verification performed by verifier 242. Specifically, controller 243 performs transmission control in one of the following three patterns. This transmission control will be described with reference to FIG. 7 to FIG. 9.

FIG. 7 is a diagram for illustrating pattern 1 of transmission control. FIG. 8 is a diagram for illustrating pattern 2 of transmission control. FIG. 9 is a diagram for illustrating pattern 3 of transmission control.

First, pattern 1 will be described with reference to FIG. 7.

Pattern 1 is an example in which controller 243 voluntarily transmits a first analysis log to server 100, and transmits a second analysis log to server 100 in response to a transmission request from server 100.

With regard to the first analysis log, controller 243 performs the following transmission control. When obtainer 241 obtains the first analysis log, controller 243 voluntarily transmits the first analysis log to server 100. Specifically, when validity of the first analysis log is verified, that is, when the first analysis log is valid in the case where the first analysis log is obtained from processing device 210, controller 243 voluntarily transmits the first analysis log to server 100. On the other hand, when the validity of the first analysis log is not verified, that is, when the first analysis log is invalid in the case where the first analysis log is obtained from processing device 210, controller 243 does not transmit the first analysis log to server 100.

Moreover, with regard to the second analysis log, controller 243 transmits the second analysis log to server 100 when receiving a transmission request from server 100, and does not perform voluntary transmission. When obtainer 241 receives a transmission request for an analysis log from server 100, controller 243 transmits the second analysis log to server 100 in response to the transmission request. Specifically, when obtainer 241 receives a transmission request for the second analysis log from server 100, controller 243 transmits the second analysis log to server 100 in accordance with a result of verification of the second analysis log that is the target of the transmission request. Specifically, in this case, when the result of the verification indicates that the second analysis log is valid information, controller 243 transmits the second analysis log determined as valid information to server 100. For example, when the result of the verification indicates that the second analysis log is valid information, controller 243 transmits the second analysis log to which identification information is not added to server 100. On the other hand, when the result of the verification indicates that the second analysis log is not the valid information, that is, when the second analysis log is invalid information, controller 243 transmits the second analysis log to server 100 together with invalid identification information indicating that the second analysis log is not valid information. Stated differently, controller 243 transmits the second analysis log to which the invalid identification information is added to server 100.

Next, pattern 2 will be described with reference to FIG. 8.

Pattern 2 is an example in which controller 243 voluntarily transmits a first analysis log and a second analysis log to server 100.

With regard to the first analysis log, controller 243 performs the same process as in pattern 1. Since the specific process is the same as the process performed on the first analysis log in pattern 1, the detailed description thereof is omitted.

Moreover, with regard to the second analysis log, controller 243 performs the same process as the process performed on the first analysis log. Since the specific process can be described by reading the first analysis in pattern 1 as the second analysis log, the detailed description thereof is omitted.

Finally, pattern 3 will be described with reference to FIG. 9.

Pattern 3 is an example in which controller 243 transmits a first analysis log and a second analysis log to server 100 in response to a transmission request from server 100.

With regard to the first analysis log, controller 243 performs the same process as the process performed on the second analysis log in pattern 1. Since the specific process can be described by reading the second analysis as the first analysis log in the description of the process performed on the second analysis log in pattern 1, the detailed description thereof is omitted.

With regard to the second analysis log, controller 243 performs the same process as the process performed on the second analysis log in pattern 1. Since the specific process is the same as the process performed on the second analysis log in pattern 1, the detailed description thereof is omitted.

It should be noted that when an analysis log to be transmitted is valid information, as stated above, controller 243 may output an analysis log determined as valid to server 100 without adding identification information to the analysis log, and may output the analysis log to server 100 together with valid identification information indicating that the analysis log determined as valid information is the valid information. As stated above, when the analysis log to which the valid identification information is added is transmitted to server 100, and the analysis log to which the invalid identification information is added is transmitted to server 100, the valid identification information and the invalid identification information added to the respective analysis logs may each be indicated by identification information indicating whether the analysis log is valid. In this case, for example, the identification information may be a flag indicated by 0 or 1. The flag indicated by 0 indicates that the analysis log is valid, and the flag indicated by 1 indicates that the analysis log is invalid.

Storage device 244 stores first analysis logs and second analysis logs. Storage device 244 may temporarily store first analysis logs and second analysis logs. In other words, storage device 244 may delete first analysis logs and second analysis logs that exceed a predetermined storage capacity, in chronological order. Moreover, storage device 244 may delete a first analysis log and a second analysis log transmitted to server 100. It should be noted that storage device 244 is implemented by a storage portion (nonvolatile memory) included in ECU_D24. In addition, storage device 244 may be implemented by storage not shown in FIG. 4.

[Operation]

The following describes operation of management device 240.

Figure 10:
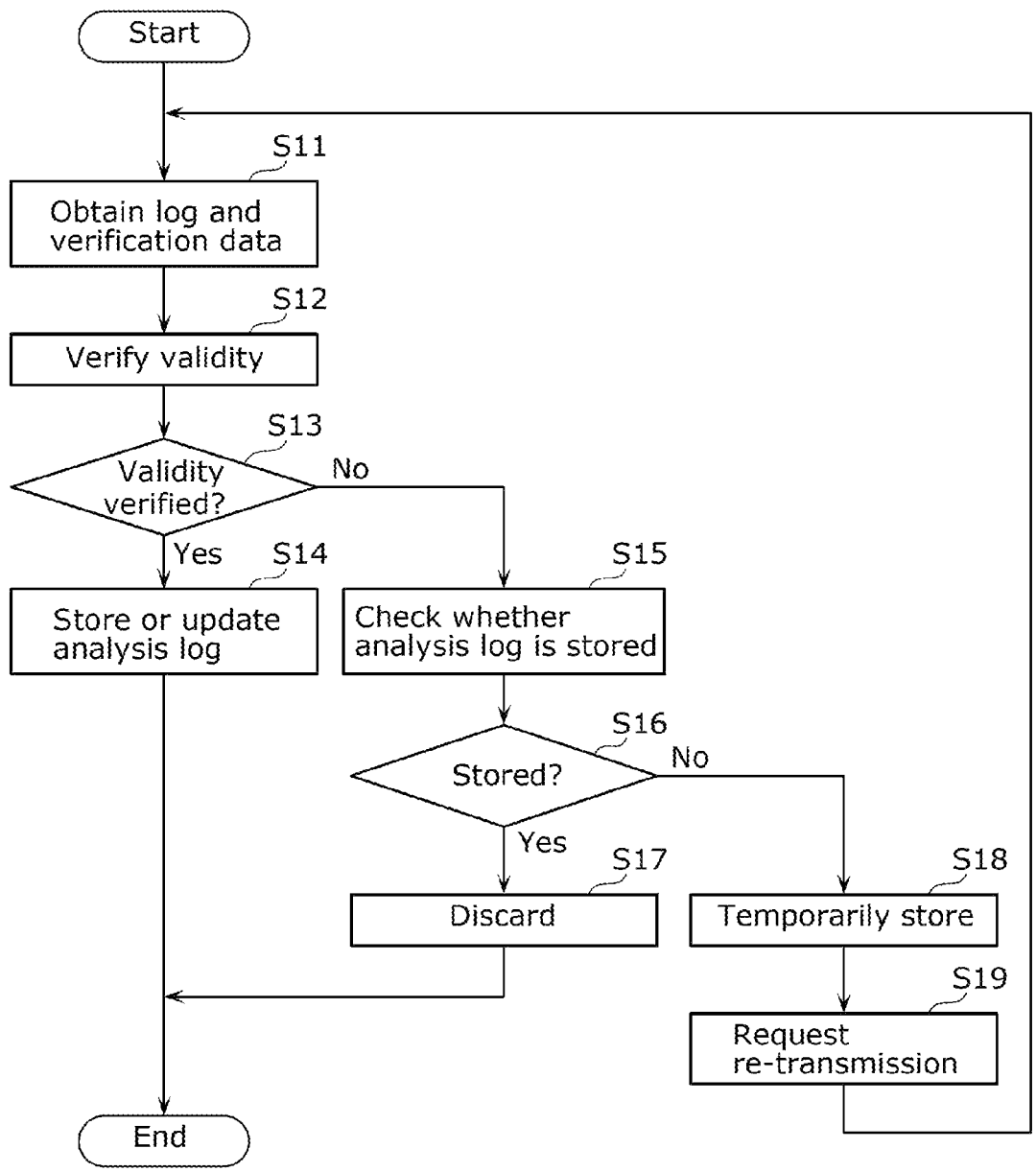
FIG. 10 is a flow chart illustrating an example of an analysis log storing process in the management device according to the embodiment.

FIG. 10 is a flow chart illustrating an example of an analysis log storing process in the management device according to the embodiment.

First, management device 240 obtains a log and verification data from each of processing devices 210, 220, and 230 (S11). Step S11 is performed by obtainer 241.

Next, management device 240 performs verification of whether the log is valid information, based on the verification data obtained (S12). Step S12 is performed by verifier 242.

Then, management device 240 determines whether validity is verified in step S12, that is, whether the log is valid information (S13).

After that, when the validity is verified (Yes in S13), management device 240 stores, as an analysis log, the log of which the validity is verified into storage device 244 (S14). It should be noted that when an analysis log determined as invalid that is the same as the analysis log is already temporarily stored in storage device 244, management device 240 updates the analysis log with a valid analysis log. In other words, management 240 replaces an invalid analysis log with a valid analysis log so that the valid analysis log is stored.

On the other hand, when the validity is not verified (No in S13), management device 240 checks whether the same log as the log of which the validity is not verified is stored in storage device 244 (S15). It should be noted that whether the logs are the same may be determined based on identifiers assigned to the logs.

Next, when the same log as the log of which the validity is not verified is stored in storage device 244 (Yes in S16), management device 240 discards the log of which the validity is not verified (S17).

When the same log as the log of which the validity is not verified is not stored in storage device 244 (No in S16), management device 240 temporarily stores, as an analysis log, the log of which the validity is not verified into storage device 244 (S18).

Then, management device 240 outputs a re-transmission request for the same log as the log of which the validity is not verified to a corresponding one of the processing devices that has outputted the log (S19). Steps S13 to S19 are performed by controller 243.

After that, management device 240 performs step S11 and the subsequent steps on the log and the verification data obtained as a result of the re-transmission request.

Figure 11:
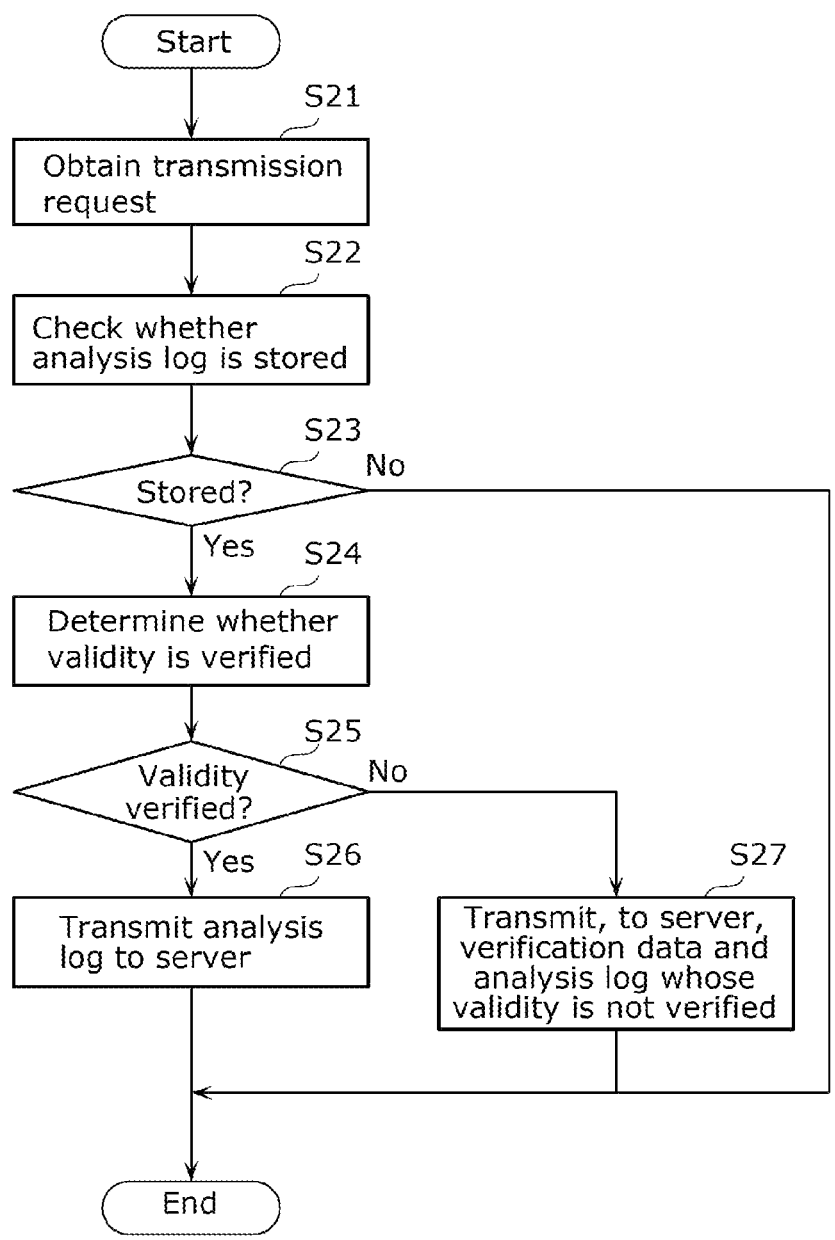
FIG. 11 is a flow chart illustrating an example of analysis log transmission control in the management device according to the embodiment.

FIG. 11 is a flow chart illustrating an example of analysis log transmission control in the management device according to the embodiment.

First, management device 240 receives a transmission request from server 100 (S21). Step S21 is performed by obtainer 241.

Next, management device 240 checks whether an analysis log that is a target of the transmission request is stored in storage device 244 (S22).

Then, when the analysis log that is the target of the transmission request is stored in storage device 244 (Yes in S23), management device 240 determines whether validity of the analysis log is verified, that is, whether the analysis log is valid or invalid (S24). Specifically, when an analysis log is stored together with invalid identification information, management device 240 determines the analysis log as an invalid analysis log; and when an analysis log is stored without assigning identification information to the analysis log or stored together with valid identification information, management device 240 determines the analysis log as a valid analysis log.

After that, when the validity of the analysis log is verified, that is, when the analysis log is valid information (Yes in S25), management device 240 transmits the analysis log to server 100 (S26).

On the other hand, when the validity of the analysis log is not verified, that is, when the analysis log is invalid information (No in S25), management device 240 transmits verification data of which validity is not verified and the analysis log to which the invalid identification information is assigned to server 100 (S27).

[Advantageous Effects etc.]

Management device 240 according to the embodiment includes obtainer 241, verifier 242, and controller 243. Obtainer 241 obtains, from each of processing devices 210, 220, and 230, a log of operation performed by the processing device and verification data for certifying that the log is valid information. Verifier 242 performs verification of whether the log is valid information, based on the verification data obtained by obtainer 241. Controller 243 performs storage control for storing the log as an analysis log for analyzing an anomaly into storage device 244, in accordance with a result of the verification performed by verifier 242.

With this configuration, since management device 240 controls the storage of the log into storage device 244, according to whether the log is valid based on the verification data, management device 240 is capable of managing the analysis log appropriately.

Moreover, in management device 240 according to the embodiment, when the result of the verification indicates that the log is valid information, controller 243 stores the log as the analysis log into storage device 244. For this reason, it is possible to reduce the storage capacity of storage device 244.

Furthermore, in management device 240 according to the embodiment, when the result of the verification indicates that the log is not valid information, controller 243 stores the log as the analysis log into storage device 244 together with invalid identification information indicating that the log is not valid information. Accordingly, when the log is invalid, it is possible to store the log as an analysis log that is invalid into the storage device.

Moreover, in management device 240 according to the embodiment, when the result of the verification indicates that the log is not valid information, controller 243 transmits a re-transmission request for the log and the verification data to the processing device that has outputted the log that is not valid information. Obtainer 241 obtains the log and the verification data that are re-transmitted from the processing device in response to the re-transmission request. Verifier 242 performs the verification based on the verification data re-transmitted. When the result of the verification indicates that the log is valid information, controller 243 updates the analysis log that is invalid stored in storage device 244 with the log re-transmitted. For this reason, when the log is invalid, it is possible to replace the analysis log that is invalid stored in storage device 244 with the analysis log that is valid.

Furthermore, in management device 240 according to the embodiment, controller 243 stores, into storage device 244, a log as a first analysis log in which each of processing devices 210, 220, and 230 has detected an anomaly, and stores, into storage device 244, a log as a second analysis log that is generated by each of processing devices 210, 220, and 230 at a timing prior to or subsequent to a timing at which the first analysis log is generated. Accordingly, it is possible to store, into storage device 244, the analysis log generated when the anomaly is detected and the analysis log generated when the anomaly is not detected in distinction from each other.

Moreover, in management device 240 according to the embodiment, controller 243 performs transmission control for transmitting the analysis log to server 100, in accordance with the result of the verification. With this configuration, since management device 240 controls whether the analysis log is transmitted to server 100, in accordance with the result of the verification, management device 240 makes it possible to manage the analysis log appropriately.

Furthermore, in management device 240 according to the embodiment, in the transmission control, when the result of the verification indicates that the analysis log is not valid information, controller 243 transmits the analysis log to server 100 together with the invalid identification information. For this reason, server 100 is capable of storing the analysis log that is invalid and the analysis log that is valid in distinction from each other.

Moreover, in management device 240 according to the embodiment, in the transmission control, when obtainer 241 obtains a first analysis log in which the processing device has detected an anomaly, controller 243 voluntarily transmits the first analysis log to server 100. In addition, in the transmission control, when obtainer 241 receives, from server 100, a transmission request for a second analysis log generated by the processing device at a timing prior to or subsequent to a timing at which the first analysis log is generated by the processing device, controller 243 transmits the second analysis log to server 100 in response to the transmission request. Accordingly, management device 240 is capable of immediately transmit, to server 100, the first analysis log generated when the anomaly is detected.

[Variations]

(1)

Although when voluntarily transmitting a first analysis log or a second analysis log to server 100, management device 240 according to the aforementioned embodiment does not transmit an invalid analysis log of which validity is not verified, the present disclosure is not limited to this example. Management device 240 may transmit, to server 100, an invalid analysis log together with invalid identification information indicating the invalid analysis log.

(2)

Although when an analysis log determined as invalid that is the same as an analysis log is already temporarily stored in storage device 244, management device 240 according to the aforementioned embodiment updates the analysis log determined as invalid with a valid analysis log, the present disclosure is not limited to this example. Moreover, when a re-transmission request is repeated twice or more, management device 240 may store, into storage device 244, one analysis log and analysis logs obtained as a result of the re-transmission request that are the same as the one analysis log.

(3)

Figure 12:
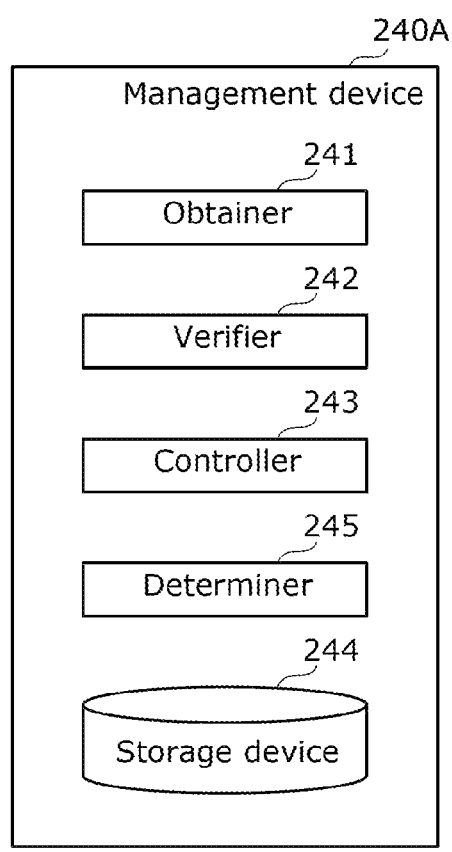
FIG. 12 is a block diagram illustrating an example of a functional configuration of a management device according to Variation (3).

Management device 240A according to Variation (3) will be described with reference to FIG. 12. FIG. 12 is a block diagram illustrating an example of a functional configuration of a management device according to Variation (3).

Management device 240A differs from management device 240 according to the embodiment in further including determiner 245 that determines whether a cyberattack has been carried out on vehicle 200. Since the other constituent elements are the same as the constituent elements of management device 240, the description thereof is omitted.

Specifically, when validity of verification data for a first analysis log is not verified once or more, that is, when the first analysis log is invalid information, determiner 245 may determine that a cyberattack has been carried out on vehicle 200. In this case, determiner 245 may determine that the cyberattack has been carried out on a processing device having generated the invalid first analysis log.

Moreover, when validity of verification data for second analysis logs each received from a different one of processing devices 210, 220, and 230 is not verified, that is, when the second analysis logs are invalid information, determiner 245 may determine that a cyberattack has been carried out on vehicle 200. The second analysis logs are logs generated in a predetermined period. Here, the predetermined time is a period from the earliest timing to the latest timing among timings at which the respective second analysis logs are generated.

It should be noted that vehicle 200 is an example of a mobile body.

When determiner 245 determines that the cyberattack has been carried out on vehicle 200, controller 243 of management device 240A may switch electronic control to machine control by switching autonomous driving control to manual driving control in the case where vehicle 200 is performing the autonomous driving control. Since this makes it possible to prevent the autonomous driving control from being subject to the influence of the cyberattack, it is possible to avoid the occurrence of an accident.

Moreover, when determiner 245 determines that the cyberattack has been carried out on vehicle 200, controller 243 may notify a driver of the cyberattack on vehicle 200. A notification to the driver may be performed by causing a display (not shown) included in vehicle 200 to display a notification or a loudspeaker (not shown) included in vehicle 200 to output a notification sound. Additionally, a notification may be, for example, a message prompting the driver to make a brief stop at a safe place. Since such a notification allows the driver to, for example, switch vehicle 200 from autonomous driving control to manual driving control or briefly stop vehicle 200 at a safe place, the driver can avoid the occurrence of an accident.

(4)

Although the aforementioned embodiment or each of the variations shows an example in which management device 240 or 240A is provided to vehicle 200 and included in an in-vehicle network system that performs communication for control of vehicle 200, management device 240 or 240A may be included in a network system for controlling a control target of a mobile body other than vehicle 200. The mobile body is, for example, a robot, an aircraft, a watercraft, a machine, farm equipment, or a drone.

As described above, the embodiment has been described as an example of the technique according to the present disclosure. The accompanying Drawings and the detailed descriptions thereof are provided for that purpose.

Accordingly, the constituent elements described in the accompanying Drawings and the detailed descriptions may include not only those essential for solving the problems but also those not essential for solving the problems, to illustrate the above technique. As such, descriptions of these non-essential constituent elements in the accompanying Drawings and the detailed descriptions should not be readily interpreted to mean that these non-essential constituent elements are essential.

Moreover, since the aforementioned embodiment is for illustrating the technique according to the present disclosure, various changes, substitutions, additions, and omissions, etc. can be made within the scope of the Claims or its equivalents.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, a management device, a management method, and a recording medium that is capable of managing analysis logs appropriately.

The invention claimed is:
1. A management device comprising:
an obtainer that obtains, from a processing device, a log of operation or communication performed by the processing device and verification data for certifying that the log is valid information;
a verifier that performs verification of whether the log is valid information, based on the verification data obtained by the obtainer; and
a controller that performs storage control for storing the log as an analysis log for analyzing an anomaly into a storage device, in accordance with a result of the verification performed by the verifier,
wherein when the result of the verification indicates that the log is not valid information, the controller stores the log as the analysis log into the storage device together with invalid identification information, and transmits a re-transmission request for the log and the verification data to the processing device, the invalid identification information indicating that the log is not valid information,
the obtainer obtains the log and the verification data that are re-transmitted from the processing device in response to the re-transmission request,
the verifier performs the verification based on the verification data re-transmitted, and
when the result of the verification indicates that the log is valid information, the controller updates the analysis log that is invalid stored in the storage device with the log re-transmitted.
2. The management device according to claim 1,
wherein when the result of the verification indicates that the log is valid information, the controller stores the log as the analysis log into the storage device.
3. The management device according to claim 1,
wherein the controller performs transmission control for transmitting the analysis log to a server, in accordance with the result of the verification.
4. The management device according to claim 3,
wherein in the transmission control, when the result of the verification indicates that the analysis log is not valid information, the controller transmits the analysis log to the server together with the invalid identification information.

5. The management device according to claim 3,
wherein in the transmission control:
when the obtainer obtains a first analysis log in which the processing device has detected an anomaly, the controller voluntarily transmits the first analysis log to the server; and
when the obtainer receives, from the server, a transmission request for a second analysis log generated by the processing device at a timing prior to or subsequent to a timing at which the first analysis log is generated by the processing device, the controller transmits the second analysis log to the server in response to the transmission request.

6. The management device according to claim 1, further comprising:
a determiner that determines whether a cyberattack has been carried out on a mobile body including the processing device, in accordance with the result of the verification.

7. The management device according to claim 1,
wherein the processing device is an electronic control unit (ECU) included in a vehicle.

8. A management device, comprising:
a processor; and
a memory including a program that, when executed by the processor, causes the processor to perform operations, the operations including:
obtaining, from a processing device, a log of operation or communication performed by the processing device and verification data for certifying that the log is valid information;
performing verification of whether the log is valid information, based on the verification data obtained by the obtainer processor; and
performing storage control for storing the log as an analysis log for analyzing an anomaly into a storage device, in accordance with a result of the verification performed by the processor,
wherein the processor stores, into the storage device, a first analysis log in which the processing device has detected the anomaly, and stores, into the storage device, a second analysis log that is generated by the processing device at a second timing subsequent to a first timing at which the first analysis log is generated by the processing device.

9. A management method comprising:
obtaining, from a processing device, a log of operation or communication performed by the processing device and verification data for certifying that the log is valid information;
performing verification of whether the log is valid information, based on the verification data obtained; and
performing storage control for storing the log as an analysis log for analyzing an anomaly into a storage device, in accordance with a result of the verification,
wherein when the result of the verification indicates that the log is not valid information, the log is stored as the analysis log into the storage device together with invalid identification information, and a re-transmission request for the log and the verification data is transmitted to the processing device, the invalid identification information indicating that the log is not valid information,
the log and the verification that are re-transmitted from the processing device in response to the re-transmission request are obtained,
the verification is performed based on the verification data re-transmitted, and
when the result of the verification indicates that the log is valid information, an invalid analysis log stored in the storage device is updated with the log re-transmitted.

10. A non-transitory computer-readable recording medium having recorded thereon a computer program for causing a computer to execute the management method according to claim 9.

11. A management method, comprising:
obtaining, from a processing device, a log of operation or communication performed by the processing device and verification data for certifying that the log is valid information;
performing verification of whether the log is valid information, based on the verification data obtained; and
performing storage control for storing the log as an analysis log for analyzing an anomaly into a storage device, in accordance with a result of the verification,
wherein a log in which the processing device has detected the anomaly is stored as a first analysis log into the storage device, and a log generated by the processing device at a second timing subsequent to a first timing at which the first analysis log is generated by the processing device is stored as a second analysis log into the storage device.

12. A non-transitory computer-readable recording medium having recorded thereon a computer program for causing a computer to execute the management method according to claim 11.

* * * * *